Nov. 12, 1957    R. C. TILLINGHAST    2,812,708
METHOD AND APPARATUS FOR HANDLING AND
PROCESSING COTTON BALES AND THE LIKE
Filed Aug. 5, 1955    3 Sheets-Sheet 1
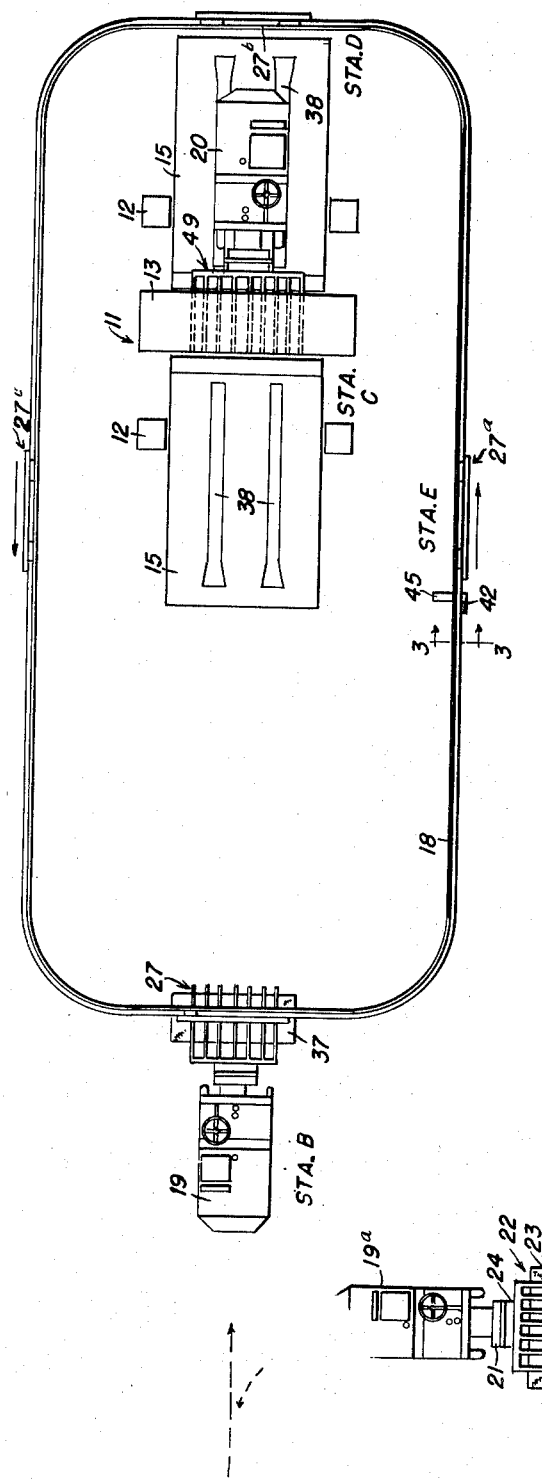
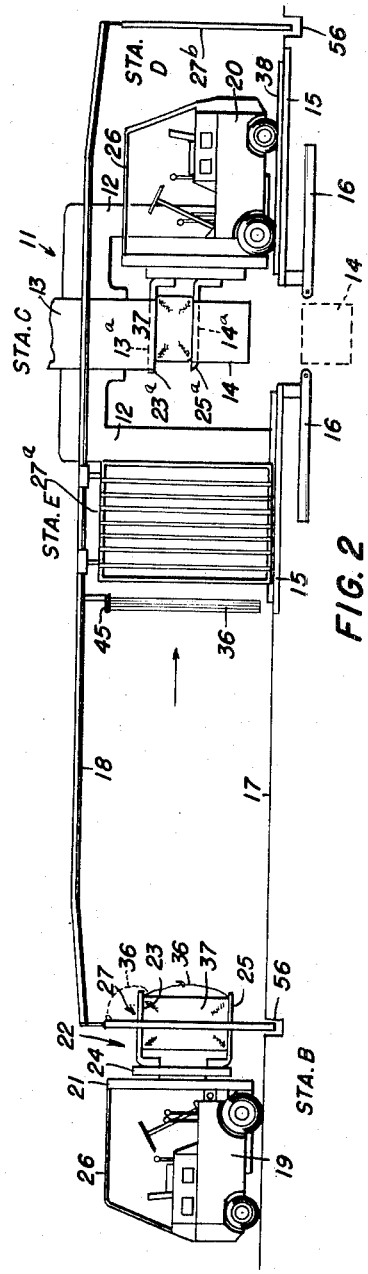
INVENTOR
RAY C. TILLINGHAST
BY
ATTORNEY Nov. 12, 1957  R. C. TILLINGHAST  2,812,708
METHOD AND APPARATUS FOR HANDLING AND
PROCESSING COTTON BALES AND THE LIKE
Filed Aug. 5, 1955  3 Sheets-Sheet 2
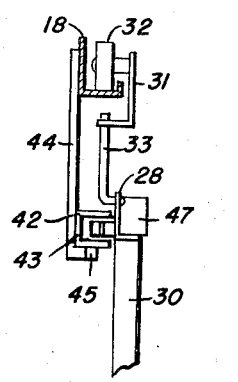
FIG. 3
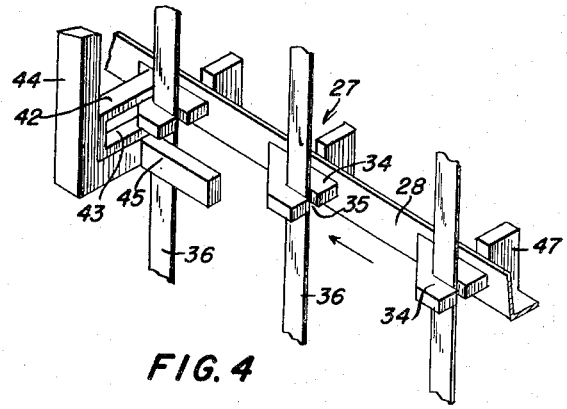
FIG. 4
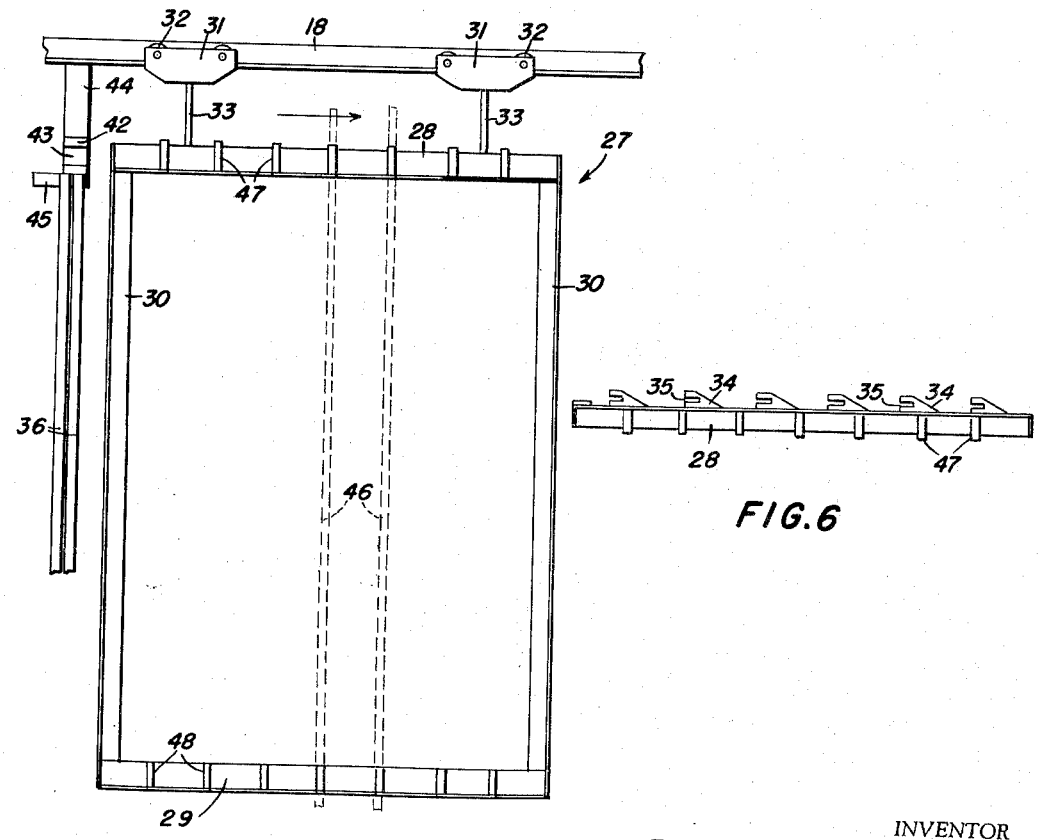
FIG. 5
FIG. 6
INVENTOR
RAY. C. TILLINGHAST
BY
ATTORNEY Nov. 12, 1957  R. C. TILLINGHAST  2,812,708
METHOD AND APPARATUS FOR HANDLING AND
PROCESSING COTTON BALES AND THE LIKE
Filed Aug. 5, 1955  3 Sheets-Sheet 3
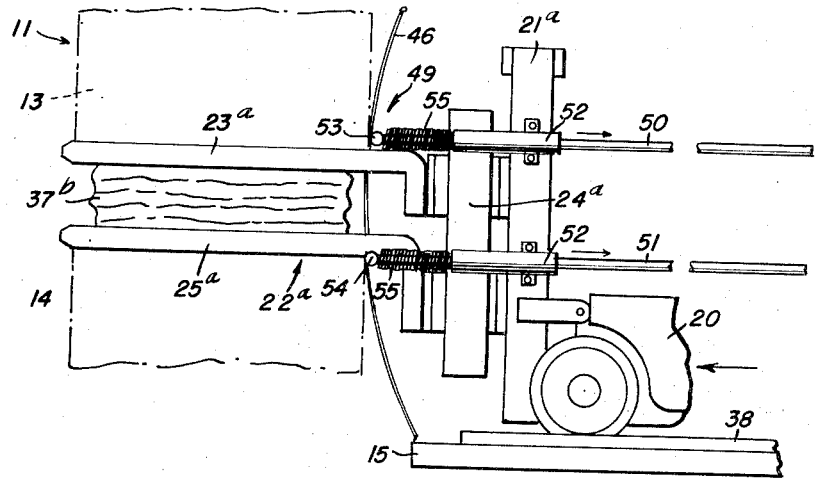
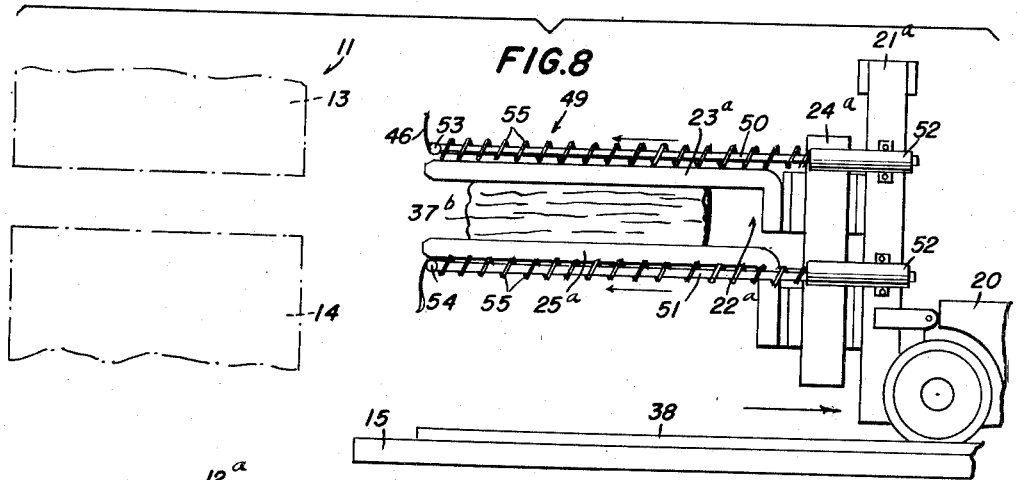
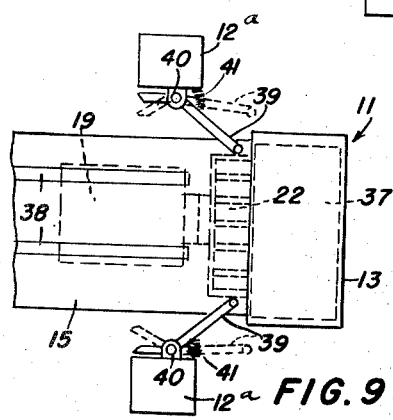
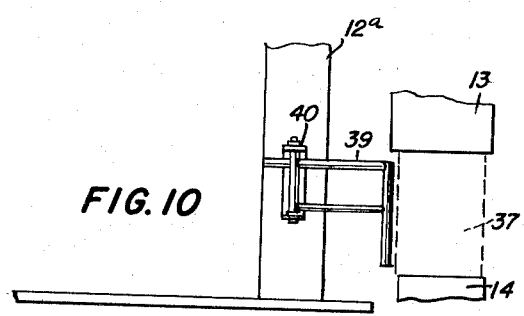
INVENTOR
RAY C. TILLINGHAST
BY
ATTORNEY

United States Patent Office 2,812,708
Patented Nov. 12, 1957

2,812,708

METHOD AND APPARATUS FOR HANDLING AND PROCESSING COTTON BALES AND THE LIKE

Ray C. Tillinghast, Memphis, Tenn., assignor to National Cotton Compress and Cotton Warehouse Association, Memphis, Tenn., a non-profit trade association of Louisiana Application August 5, 1955, Serial No. 526,729

10 Claims. (Cl. 100—219)

This invention relates to the handling and compressing of cotton bales and the like from the time the bales are received from the gin in temporary banded form until they are finally compressed and rebanded for shipment. More particularly, the invention consists in new and useful improvements in a system of handling and processing bales for shipment, in a coordinated cycle of operations wherein the "flat" bales, as received from the gin, are pre-compressed for band removal while being transported to the main press, the original bands being removed, the bales compressed, removed from the press while maintained under compression, and then rebanded, in a continuous cycle.

As background, it may be stated that there are approximately 325 compress machines in operation in the United States. They are all basically the same and rely largely upon manual operations in the handling of the bales.

Under conventional practices the "flat" bale is loaded either by a hand truck or a clamp truck into a small pre-press, generally known as a "dinky," where it receives a slight compression sufficient to loosen the bands which have been applied at the gin, so that the buckles can be unhooked. Wire hooks are then engaged in the burlap bagging which covers the top and bottom of the bale when it leaves the gin, said bagging being secured on the bale by the use of six bands or ties which are applied at the gin. In compressing this bale in the "dinky" press, the burlap bagging is permitted to remain on the bale but the six bands are removed as they will be too long after the bale is compressed to either standard density or high density and, furthermore, they are not properly spaced, eight bands being required to hold the finally compressed bale together.

These retaining hooks hold the bale together after its removal from the "dinky" press, sufficiently for its trip into a conventional compress machine, of which there are several specific varieties. After the original bands are unbuckled and the hooks inserted into the bagging, the pressure on the "dinky" press is released and the bale is pushed out into a waiting hand truck where the bands are stripped off manually. A trucker then wheels the bale to the main press with the aid of the man who holds the loose bagging up out of engagement with the wheels.

At the main press, the trucker dumps the bale onto the lower platen and the head sewers position it with the reefers assisting as necessary. The lever man starts the press which compresses the bale between the lower and upper platens and as this is taking place the tiers insert two ties apiece through the channels of the upper platen and the reefers return them through the channels in the bottom platen. The tiers then buckle the two loose ends of each of the bands protruding on their side of the press and while this is in process the head sewers wrap the bagging over the bale heads and sew it into place. The lever man then releases the press and the reefers, with the aid of two bars, push the bale out of the press where it is hooked by the hook man with special hooks on the end of a cable from a gib frame. The crane drags the bale away from the press and sets it up against a rail or lays it on a trailer for hauling. Many of these operations are performed simultaneously but obviously considerable man hours are lost in waiting between operations.

In my co-pending application, Serial No. 347,800, filed April 9, 1953 which issued as Patent No. 2,728,287, I described a bale conveyor and handling assembly for use in connection with conventional presses and by means of which a bale is received from the "dinky" press and conducted through a series of stations designed to accomplish the above operations in successive steps, without removing the bale from the bale retaining cage which travels around an endless conveyor from station to station. The present invention is in the nature of an improvement on that disclosed in my said co-pending application.

The primary object of this invention is to provide a system adapted to utilize more or less conventional power lift trucks equipped with special clamping forks in lieu of the bale cages and fixed conveyor system of said former invention.

Another object of the invention is to provide an endless, overhead monorail encompassing the main press and adapted to support a series of band handling frames which successively travel from a band stripping station to a band gathering station, then to a rebanding station, after which they return to the original band stripping station, means being provided whereby the original bands are stripped from the bales while they are retained in partial compressed condition by the feeding lift trucks and for rebanding the bales after compression, while they are retained in the removal lift trucks.

A further object of the invention is to provide a system wherein the "flat" bales from the gin are picked up in a lift truck and transported to the band stripping station, while simultaneously undergoing a partial compression to facilitate the removal of the original bands from the bale.

A still further object of the invention is to provide means whereby the force of the feed lift truck, while transporting the bales to the main press, is utilized for stripping the original bands from the bale.

Still another object of the invention is to provide means whereby the force of the removal lift truck while embracing a compressed bale, is utilized in rebanding the bale.

Another object of the invention is to provide in a system of this character, a novel band handling frame adapted to travel around an endless monorail conveyor and equipped with means for gripping the loosened bands at one end and anchoring them as the bale is pushed through the frame by the power lift truck, in compressed condition, thus sliding the bands from around the bale.

Still another object of the invention is to provide a frame of this type which is additionally provided with magnetic means for positioning the new bands for application to the compressed bales as they are removed from the press.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views, Figure 1 is a more or less diagrammatic top plan view of a bale press, showing the relationship of the monorail conveyor and the various stations.

Figure 2 is a view of the same in side elevation,

Figure 3 is an enlarged transverse sectional view, taken on line 3—3 of Figure 1, showing the monorail and a portion of the band handling frame.

Figure 4 is an enlarged fragmentary perspective view of the upper portion of the band handling frame, showing the band retaining means.

Figure 5 is an enlarged elevational view of the band handling frame suspended from the monorail.

Figure 6 is a top plan view of the band handling frame.

Figure 7 is a view in side elevation, showing the bale engaging forks of the removal lift truck and the rebanding mechanism, just prior to the actual rebanding operation.

Figure 8 is a similar view, showing the forks and bale removed from the main press and with the bands applied around the bale.

Figure 9 is a top plan view of the press, showing the automatic gate mechanism for restraining the bale upon removal of the forks of the lift truck, the latter being shown in dotted lines, and Figure 10 is a view in side elevation, showing the bale restraining gates.

In the drawings, referring first to Figures 1 and 2, a conventional bale press is generally indicated by the numeral 11 and includes the frame structure 12, supporting a fixed upper platen 13, and a vertically reciprocable lower platen 14. This structure is shown more or less diagrammatically in the interests of simplicity. The usual wooden type doors 15 are shown in open position at floor level 17 and the conventional high density doors are represented at 16.

A substantially oval shaped monorail 18, supported by any suitable means (not shown), encompasses the press 11 in elevated position as shown in Figure 2. This monorail 18 serves as a conveyor track for the band handling frames to be described at a later point.

The system involves the use of two sets of power lift trucks, one set for feeding bales to the main press and another set for removing compressed bales from the main press. There are preferably two feed trucks 19 and 19a and two removal trucks, one of which is shown at 20 in Figures 1 and 2, the idea being that while one of either sets of trucks is performing its intended function, the other of that set is being readied for use so as to maintain a continuous cycle of operation.

The two sets of lift trucks employed in this system may be conventional in design and a detailed description thereof is unnecessary to an understanding of the present invention. However, each truck is provided with a specially constructed clamping fork unit which is hydraulically controlled and carried by the main mast of the conventional lift truck. Although the feed trucks and removal trucks are equipped with bascially similar clamping fork units, they differ specifically because of the nature of the operation they are intended to perform. The forward end of each truck is provided with the usual mast 21, which supports the clamping fork unit generally indicated by the numeral 22 and is provided with hydraulic means (not shown) for raising and lowering the clamping fork as a unit. The clamping fork includes a fixed upper fork 23, mounted on a vertical frame member 24, which in turn is carried by the hydraulic control in the mast 21. A bottom fork 25 is slidably mounted on the frame member 24 and by means of a second hydraulic mechanism (not shown) carried by the frame 24, the lower fork is movable toward and away from the fixed upper fork 23. The auxiliary hydraulic mechanism, carried by the frame member 24, is designed to develop a pressure of 40,000 lbs. on a bale of cotton or the like contained between the two forks 23 and 25.

As the "flat" bales coming from the gin are provided with six bands, the upper and lower forks of the unit 22 are provided with seven forwardly directed fingers, spaced laterally so that one finger may be inserted between each of the six bands on the bale with one finger outside of the band at each end, as will later appear in a description of the operation of the system.

As before stated, the trucks 20 for removing the compressed bales from the press 11, are basically the same as the feed trucks but inasmuch as a compressed bale of cotton usually carries nine bands, the number of fingers on the clamping fork units of the removal trucks 20, is increased to nine, or one for each band to be later applied to the compressed bale.

The opposed bale engaging faces of the upper and lower platens 13—14 of a conventional press 11 are provided with spaced horizontal channels 13a—14a by means of which, under the usual practice, the bands are applied to the compressed bale while it is in the press. With the system covered by the present invention, the channels of the conventional press are not sufficiently deep to accommodate the fingers of the clamp forks which are required to maintain the bale is compressed condition when it is withdrawn from the press, as will later appear. Therefore, it is preferred to apply cast iron blocks, which may be bolted or welded to the pressure faces of the upper and lower platens, said blocks being provided with a sufficient number of channels of a depth to accommodate the special forks of the lift trucks. In other words, the present invention makes use of channels in the upper and lower platens of the press for the insertion of the fingers of the clamping fork unit of the removal trucks, instead of for the insertion of bands. Therefore, the lateral spacing of the fingers of the clamping fork units 22a of the removal trucks 20, must coincide with the spacing of the channels 13a—14a of the respective platens of the press 11.

Both the feed trucks 19—19a and the removal trucks 20 are provided with overhead frame members 26 secured to the top of the mast 21 and to the rear end of the truck so as to afford a protection to the drivers of the trucks during the band stripping operation and the rebanding operation.

As will be seen from Figure 1, five operating stations are involved in this system, namely, the pick-up station A, where the "flat" bales from the gin are first picked up by the lift trucks 19—19a; the band stripping station B, where, as will later appear, the bands are removed from the gin or "flat" bales; the main compressing station C, where the unbanded flat bales are compressed to either standard or high density; the rebanding station D, where new bands are applied to the compressed bales; and the band handling station E, where the temporary bands are removed from the band stripping mechanism and new bands are arranged for subsequent use in the rebanding operation at station D.

Turning now to the endless monorail conveyor 18 encompassing the main press 11, it will be seen from Figure 1 that four band handling frames generally represented by the numerals 27, 27a, 27b and 27c, are shown at spaced intervals around the endless conveyor. As best seen in Figure 5, each of these frames comprises a crosshead 28 and a base 29 formed of angle irons and connected together in spaced relation by side pieces 30 to form a rectangular frame having vertical and horizontal dimensions which will permit the passage of a power lift truck 19—20, therethrough. Each of these frames is suspended from the monorail 18 by a pair of spaced brackets 31 having rollers 32 adapted to travel around the monorail, the brackets being connected to the crosshead 28 by depending connecting arms 33.

Each of these frames 27, 27a, 27b and 27c serves a dual purpose in the cycle of operation. First, they act as band strippers at station B, for removing the temporary bands applied at the gin and, secondly, they serve as band retainers and conveyors for positioning the new bands for the rebanding operation at station D, when the compressed bales are removed from the main press 11.

For the band stripping operation, the crosshead 28 of each band handling frame is provided on its vertical face directed inwardly of the oval monorail 18, with a series of horizontally spaced lugs 34, projecting horizontally from the crosshead 28 and provided with open ended vertical slots 35 for receiving and restraining the buckle ends of the temporary bands 36 (Fig. 4) of a "flat" bale. The number of slotted lugs 34 corresponds with the number of temporary bands applied to the bale at the gin and as previously stated such bands are usually six in number.

This band stripping feature of the invention will best be understood by first describing the sequence of operations up to this point. The "flat" bales from the gin, represented by the numeral 37 at station A, are picked up by one of the feed lift trucks 19—19a, the bales being engaged between the upper and lower fork members 23—25 of the clamping form unit 22. Then, as shown by the arrows in Fig. 1, the truck is backed into position to be driven forwardly with the bale to the band stripping station B. Meanwhile, during this manipulation of the truck, the hydraulic mechanisms for controlling the forks 23—25 are set into operation to exert sufficient compression on the "flat" bale 37 to release the tension on the temporary bands 36, as shown in Figure 2. It will be understood that the main hydraulic unit in the mast 21 is employed for the purpose of lifting the entire clamping fork unit 22 to bodily elevate it to the proper height and the auxiliary hydraulic mechanism in the frame member 24 is set into operation during the travel of the lift truck to force the lower fork member 25 upwardly against the fixed upper fork No. 23, developing sufficient pressure to pre-compress the bale 37.

When the feed truck is in position immediately in advance of the band handling frame 27 at station B, it is driven forwardly to present the pre-compressed bale 37 within the frame 27 at station B. The bale, now having been compressed sufficiently to loosen the bands 36, two men at station B unhook the buckles and unwrap the bagging from under the ends bands. The buckle ends of each band are then slipped into slots 35 of lugs 34 in the crosshead 28 of frame 27, leaving the opposite ends of the bands loose. Upon resuming its forward motion, the truck 19 carries the bale with it, causing the bands with their buckle ends restrained by the slotted lugs 34, to slide out from around the bale and be left hanging from the crosshead 28.

The lift truck 19 then continues with the pre-compressed, unbanded bale to the main press mechanism 11 at station C. To facilitate the guiding of the lift truck 19 into the proper position to deposit the bale 37 between the upper and lower platens 13—14 of the press 11, the open door 15 of the press, upon which the truck approaches the press, is provided with guide flanges or tracks 38, which may be of any suitable form to receive and direct the wheels of the lift truck.

When the truck 19 has presented the bale 37 between the platens of the press 11, the hydraulic pressure on the lower fork member 25 is released so that the unbanded bale can be deposited on the lower platen 14 of the press. In order to restrain the bale 37, as the forks of the truck are withdrawn, an automatic gate mechanism, such as shown in Figures 9 and 10 is installed on the entrance side of the press. Here it will be seen that a pair of opposed gate members 39 are pivotally mounted on vertical axes 40 carried by upright members 12a which may be portions of the press frame 12. The free ends of the gates 39 are normally urged inwardly toward one another by spring means 41 so that they lie within the path of movement of the clamping fork unit 22 as it approaches the press. As seen in Figure 9, the gates 39 are maintained in converging relation so that as the bale approaches, it spreads the gates apart against the tension of their springs 41 and immediately upon clearing the gates, the latter are forced inwardly so that they overlie the rear edges of the bale 37.

Thus, when the lift truck 19 is reversed and withdraws the clamping fork unit 22, the free edges of the gates 39 engage the corners of the bale and eject it from the clamp unit, onto the lower platen 14 of the press.

It will be understood that while lift truck 19 is going through the band stripping station B and then to the press 11, the second lift truck 19a is picking up a "flat" bale at station A, and by the time truck 19 returns to station A, truck 19a is ready to go through station B and thence to the press 11.

Although the next step in the system, so far as the bale is concerned, is the removal of the compressed bale from station C and its rebanding at station D, there are certain intermediate operations concerning the band handling frame 27 which occur at station E. These intermediate operations will now be described so that the following operations may be better understood.

Returning to Figures 3 to 6 of the drawings, it will be seen that immediately anterior to the band transfer station E (Figure 1) the monorail 18 is provided with a depending, horizontally disposed fork member 42 having a central slot 43 and supported by an arm 44 suitably connected to the under side of the monorail 18. The frame member 42 is a fixed member so arranged that the slot 43 is in line to receive the slotted band retaining lugs 34 carried by the cross head 28 of the band handling frame 27, as the latter moves toward station E in the direction of the arrow shown in the drawings. Projecting forwardly from the lower portion of the fork 42 and underlying the projecting slotted lugs 34 as they move along, is a permanent magnet 45 of sufficient length and magnetic force to attract and retain the six bands 36 which are carried by the band handling frame 27 in its travel from station B to station E.

Thus, as the band handling frame 27 approaches station E, the slotted lugs 34 successively pass through the slot 43 in frame member 42, which ejects the bands 36 from the slots in the lugs 34, and the bands are collected on the inner face of the permanent magnet 45 and left hanging thereon until removed by one of the operators at station E. By the time the band handling frame 27 reaches station E, it has been cleared of bands and is ready for the attachment of new bands for the rebanding operation, as will now be described.

Inasmuch as the original gin bands 36 are of greater length than those to be required in the re-banding operation and, furthermore, as a greater number of new bands are required to retain the highly compressed bale after it leaves the press 11, a series of new bands 46 are applied to the band handling frame 27 at station E, prior to its travel to re-banding station D. For this purpose, the cross head 28 of the frame 27 and the base member 29 thereof, are provided with a series of aligned, transversely spaced magnets 47 and 48 respectively. These magnets project outwardly from the upright portions of the cross head and base member on the opposite side from the slotted band retaining lugs 34 and their spacing is arranged to coincide with the ultimate spacing of the new bands 46 to be applied to the compressed bale 37b. An operator at station E applies a series of bands 46 which extend between the vertically spaced magnets 47 and 48 and are thereby retained in place on the frame 27 as the latter travels to station D immediately in line with the point of entrance of the removal truck 20.

In the rebanding operation at station D, one of the two removal trucks 20 is brought into line for passage through the band handling frame 27b, to which a series of new bands 46 has been applied. The frame 27b is in direct line with the tracks 38 on the door 15 and as the truck passes through the frame on its way to remove the compressed bale 37b from the press 11, a specially designed rebanding attachment generally indicated by the numeral 49, carried on the forward end of the removal lift truck 20, encounters the bands 46 on the frame 27a.

This device 49 is carried at the forward end of the removal truck 20 in conjunction with the clamping fork unit 22a and consists of two sets of vertically spaced rods or yokes 50 and 51, one on either side of the truck 20 and slidably mounted for horizontal movement, in sleeve bearings 52 fixed to the main mast 21 of the lift truck. The forward ends of the respective pairs of rods 50—51 carry magnetized cross bars 53—54 respectively, said cross bars being of sufficient length to encounter the complete set of bands 46 retained in the band handling frame 27b at station D, yet capable of passing through the frame with the truck as the latter approaches the press 11.

As the truck 20 passes through the frame 27b toward the press 11, the cross bars 53—54 engage the intermediate portions of the series of bands 46 and slide them from their spaced magnets 47—48, the magnetism in the cross bars 53—54 being sufficient to retain the bands on the rebanding device 49. When the truck 20 reaches the press 11 the cross bars 53—54 with the bands 46 attached abut the opposed platens 13 and 14, causing the sliding rods 50 and 51 to move rearwardly in their sleeve bearings 52 against the tension of coil springs 55 which encircle each rod between its cross arm and the sleeve 52.

The forks 23a and 25a of the clamping fork unit 22a, having been relatively adjusted by their hydraulic control, to accommodate the compressed bale 37b, between the platens 13 and 14, as the truck 20 advances, the individual fingers of these forks enter the respective channels 13a—14a of the platens 13 and 14, leaving behind them the retracted band retaining device 49. Sufficient pressure is developed in the auxiliary hydraulic unit carried by the frame member 24a of truck 20 to retain the compressed bale 37b in its compressed condition after release of the platens 13—14 and from the position shown in Figure 7, the truck 20 withdraws the compressed bale 37b from the press to the position shown in Figure 8. During the course of this operation, the springs 55 on the rods 50 and 51 cause the rods and their cross arms 53—54 to move forwardly, carrying with them the free ends of the bands 46 which slide transversely over their respective cross arms and are wrapped around three sides of the compressed bale as shown in Figure 8.

The bale 37b is now ready for buckling and while it is still maintained in compressed condition by the clamping fork unit 22a, the free ends of the bands 46 are manually buckled and the truck 20 continues to the point of delivery to a conveyor or other means of handling the compressed and banded bales for storage or shipment.

In order to restrain the lower ends of the band handling frames 27 during both the band stripping operation at station B and the rebanding operation at station D, an indented guideway 56 is provided in the floor 17 at these points as shown in Figure 2. This guideway 56 may be a continuous track which coincides with the contour of the oval monorail 18 so that the lower ends of the frames simply follow the indented track.

The band handling frame 27b then continues around the monorail 18 and returns to station B for further band stripping. The band handling frames are equally spaced on the monorail and are all actuated by the same power unit (not shown) so that as one advances, they all advance. It is so timed that one frame will be at station B for band stripping, one at station E for band removal and band loading, one at station D for rebanding and one empty frame being returned to the beginning cycle. The conveyor is equipped with suitable interlocks (not shown) to prevent movement while a lift truck is inside of a frame.

Another feature of this conveyor system is that it acts as a spacer for the truck operators, thus providing a mechanical means for setting a steady pace for the truck operation.

It will be apparent that the system comprising this invention will greatly facilitate and speed up the handling of bales at a compress machine, minimizing both manpower and time consumed. Tests have shown that the total round trip from the storage area to the press and return, a distance of 110 feet, at four miles per hour, gives a travel time of 18.7 seconds or 9.4 seconds per truck. The operation consumes 30 seconds per bale in picking up the bale, unbuckling the bands, movement in and out of the press and travel time. Another 30 seconds per bale is consumed in unloading from the off side of the press, travel time, movement out of the press and rebanding.

It is estimated that with the system comprising the present invention, nine men can be eliminated from the operation. In other words, the conventional method of accomplishing the transportation of the bales to the main press, stripping the original bands from the bales, compressing the bales and rebanding them, requires 22 operators. With the present invention, it is estimated that the entire operation can be conducted by 13 operators.

From the foregoing it is believed that the invention may be readily understood by those skilled in the art without further description, is being borne in mind that numerous changes may be made in the details disclosed without departing from the spirit of the invention as set forth in the following claims.

I claim:

1. Band handling apparatus for use with a cotton compress machine and two sets of power lift trucks equipped with hydraulically actuated clamping forks, for feeding "flat" bales to said compress machine and removing compressed bales therefrom, respectively; said apparatus comprising an endless overhead track encompassing said compress machine; a series of band handling frames carried by and adapted to travel around said track, said frames having horizontal and vertical dimensions permitting one of said lift trucks to pass therethrough, with a "flat" bale pre-compressed in its clamping forks, a cross head on each frame, and means on said cross head for anchoring one end of each of a series of unbuckled temporary bale restraining bands on said "flat" bale carried by said lift truck while positioned in said frame, whereby, when said lift truck resumes its forward movement, said temporary bands will be stripped from said bale by the force of the moving truck.

2. Apparatus as claimed in claim 1, wherein said last named means consists of vertically slotted lugs projecting horizontally from said cross head.

3. Apparatus as claimed in claim 1, wherein each of said frames is provided with a horizontally disposed base member parallel with said cross head, and separate means on said cross head and base member for retaining a series of spaced, outstretched bale restraining bands adapted to be presented for application to a compressed bale upon removal from said press.

4. Apparatus as claimed in claim 3, wherein said separate means comprises a series of permanent magnets.

5. In combination with an overhead, endless track encompassing a bale compress machine, a substantially rectangular band handling frame suspended from said track and mounted for edgewise travel around the same to and from selected positions with respect to said compress machine, said frame having inside dimensions to permit a power lift truck to be driven therethrough in advancing toward said compress machine or withdrawing from the latter, a cross head at the top of said frame and means on said cross head for anchoring one free end of each of a series of unbuckled temporary bands on a "flat" bale supported in compressed condition in a lift truck halted in said frame, whereby, when said lift truck resumes its forward travel through said frame, the anchored ends of said bands are restrained and the bands are stripped from the bale and left hanging on said cross head.

6. The combination as claimed in claim 5, wherein said last named means comprises a series of transversely spaced lugs having open ended vertical slots therein, adapted to receive and anchor said bands.

7. The combination as claimed in claim 6, including a fixed abutment suspended from said track, in the line of travel of said frame crosshead, an open ended, horizontal slot in said abutment, aligned to permit the passage of said slotted lugs therethrough, whereby a series of bands suspended from said lugs may be successively ejected from said slots, and means for gathering and retaining said ejected bands.

8. The combination as claimed in claim 6, including a fixed abutment suspended from said track, in the line of travel of the cross head of said frame, an open ended horizontal slot in said abutment, aligned to permit the passage of said slotted lugs therethrough, whereby a series of bands suspended from said lugs are successively ejected from said slots, and magnetic means for gathering and retaining said ejected bands.

9. In combination with an overhead, endless track encompassing a bale compress machine, a substantially rectangular band handling frame suspended from said track and mounted for edgewise travel around the same to and from selected positions with respect to said compress machine, said frame having inside dimensions to permit a power lift truck to be driven therethrough in advancing toward said compress machine or withdrawing from the latter, a cross head at the top of said frame and means on said cross head for anchoring one free end of each of a series of unbuckled temporary bands on a "flat" bale supported in compressed condition in a lift truck halted in said frame, whereby, when said lift truck resumes its forward travel through said frame, the anchored ends of said bands are restrained and the bands are stripped from the bale and left hanging on said cross head and separate means on said frame for positioning a series of bands for application to a compressed bale.

10. The combination as claimed in claim 9, wherein said frame includes a bottom rail, parallel with said cross head, and said separate means comprises two vertically aligned sets of magnets, carried respectively by said cross head and bottom rail.

References Cited in the file of this patent

UNITED STATES PATENTS

| | | |
|---|---|---|
| 233,603 | Dederick | Oct. 26, 1880 |
| 505,580 | Watson | Sept. 26, 1893 |
| 2,037,211 | Campbell | Apr. 14, 1936 |
| 2,336,637 | Pryor | Dec. 14, 1943 |
| 2,454,135 | Burns | Nov. 16, 1948 |
| 2,624,270 | Sykes | Jan. 6, 1953 |
| 2,677,323 | O'Konski | May 4, 1954 |
| 2,728,287 | Tillinghast | Dec. 27, 1955 |